US012605738B2

(12) United States Patent
Fritz et al.

(10) Patent No.: US 12,605,738 B2
(45) Date of Patent: Apr. 21, 2026

(54) APPLICATION METHOD FOR COATING AN OBJECT, PREFERABLY ONE OR MORE MOTOR VEHICLE BODY PARTS

(71) Applicant: Dürr Systems AG, Bietigheim-Bissigen (DE)

(72) Inventors: Hans-Georg Fritz, Ostfildern (DE); Benjamin Wöhr, Eibensbach (DE); Jerome Lavallée, Albstadt (DE); Moritz Bubek, Ludwigsburg (DE); Timo Beyl, Besigheim (DE); Daniel Tandler, Stuttgart (DE); Tobias Berndt, Ditzingen (DE); Peter Haller, Herrenberg (DE)

( * ) Notice: Subject to any disclaimer, the term of this patent is extended or adjusted under 35 U.S.C. 154(b) by 61 days.

(21) Appl. No.: 18/688,373

(22) PCT Filed: Sep. 15, 2022

(86) PCT No.: PCT/EP2022/075680
§ 371 (c)(1),
(2) Date: Mar. 1, 2024

(87) PCT Pub. No.: WO2023/041666
PCT Pub. Date: Mar. 23, 2023

(65) Prior Publication Data
US 2025/0001451 A1 Jan. 2, 2025

(30) Foreign Application Priority Data
Sep. 20, 2021 (DE) ..................... 10 2021 124 196.0

(51) Int. Cl.
*B05D 1/34* (2006.01)
*B05D 7/14* (2006.01)
*B05B 12/12* (2006.01)

(52) U.S. Cl.
CPC ................. *B05D 1/34* (2013.01); *B05D 7/14* (2013.01); *B05B 12/122* (2013.01)

(58) Field of Classification Search
CPC ............ B05D 1/34; B05D 7/14; B05B 12/122
See application file for complete search history.

(56) References Cited

U.S. PATENT DOCUMENTS

2002/0028297 A1 3/2002 Dattilo
2014/0134334 A1 5/2014 Pridoehl et al.

FOREIGN PATENT DOCUMENTS

DE 19852079 A1 5/2000
DE 10224128 A1 12/2003
(Continued)

OTHER PUBLICATIONS

International Search Report and Written Opinion for PCT/EP2022/075680 mailed Jan. 2, 2023 (10 pages; with English translation).
(Continued)

*Primary Examiner* — Nathan T Leong
(74) *Attorney, Agent, or Firm* — Taft Stettinius & Hollister LLP; Thomas E. Bejin; John W. Carpenter

(57) ABSTRACT

The disclosure relates to an application method for coating different, preferably differently steep, partial areas of an object, preferably one or more motor vehicle body parts, with an applicator which applies a mixture of a first application agent and a second application agent to the partial areas, wherein a mixing ratio of the mixture is changed during the coating process of the partial areas and/or depending on different slopes of the partial areas.

25 Claims, 5 Drawing Sheets

(56) References Cited

FOREIGN PATENT DOCUMENTS

| | | | | |
|---|---|---|---|---|
| DE | 102016014919 | A1 | | 6/2018 |
| DE | 102019109208 | B3 | | 10/2020 |
| DE | 102019112113 | A1 | | 11/2020 |
| EP | 0227936 | A1 | | 7/1987 |
| JP | H08155375 | | * | 6/1996 |
| JP | H08155375 | A | | 6/1996 |
| WO | 2010046064 | A1 | | 4/2010 |

OTHER PUBLICATIONS

German Patent Office—Office Action for related application DE 10 2021 124 196.0 mailed May 20, 2022 (4 pages; with English machine translation).

* cited by examiner

APPLICATION METHOD FOR COATING AN OBJECT, PREFERABLY ONE OR MORE MOTOR VEHICLE BODY PARTS

CROSS-REFERENCE TO RELATED APPLICATIONS

This application is a national stage of, and claims priority to, Patent Cooperation Treaty Application No. PCT/EP2022/075680, filed on Sep. 15, 2022, which application claims priority to German Application No. DE 10 2021 124 196.0, filed on Sep. 20, 2021, which applications are hereby incorporated herein by reference in their entireties.

FIELD

The disclosure relates to an application method for coating different partial areas, preferably differently steep partial areas, of an object, e.g. one or more motor vehicle body parts, with an applicator which applies a mixture of a first application agent (e.g. a horizontal application agent, in particular horizontal paint) and a second application agent (e.g. a vertical application agent, in particular vertical paint) to the object, in particular the partial areas.

BACKGROUND

Applicators are known from the prior art (e.g. WO 2010/046064 A1) with which it is technically possible to coat object areas on motor vehicle body parts without atomization of the application agent and thus in particular overspray-free. Special application agents can be used for this purpose, e.g. paints, adhesives, sealants, pre-treating agents, etc. As the application agents are applied non-atomized, the composition of the application agent layer corresponds to that of the application agent that has not yet been applied. Depending on the flow properties of the application agent, it may be necessary to produce application agent variants of an application agent recipe that are adapted to the orientation of the object area. If, for example, a predominantly horizontally oriented area and a predominantly vertically oriented area are to be coated on an object, two different application agents are used for this in the state of the art, which differ in their viscosity, among other things. In automated coating plants, usually an application agent change is carried out for this by means of a so-called color changer.

Object areas, especially of motor vehicle body parts (e.g. roofs, doors, side walls, etc.), are rarely oriented exactly horizontally or exactly vertically.

Nevertheless, usually an application agent that has been optimized for a horizontal area and comprises a relatively low viscosity ("horizontal application agent") is used, and an application agent that has been optimized for a vertical area and comprises a relatively high viscosity ("vertical application agent") is used so that it does not run on the vertical area. However, a higher viscosity results in poorer application agent running. The coating result on an area inclined at 45° to the horizontal, for example, will be worse than absolutely necessary in optical terms (in particular with regard to running properties), as a horizontal application agent is not suitable for the e.g. 45° inclination and a vertical application agent must therefore be used, which is also not optimal for the 45° inclination. A disadvantage is, e.g., that a poorer coating result is to be expected due to the higher viscosity of the vertical application agent, in particular a poorer application agent running. It is also disadvantageous, e.g., that an application agent change from the horizontal application agent to the vertical application agent or vice versa is associated with a loss of time and material. In addition, there are more than just two partial areas with different slopes on a coating object such as a motor vehicle body. For example, the roof is regarded as predominantly horizontal, doors as predominantly vertical, the A-pillar is usually inclined by e.g. approx. 35°. In some cases, motor vehicle body parts such as engine hoods have both partial areas that are slightly inclined (e.g. up to) 20° and partial areas that are almost oriented vertically. The use of more than two application agent variants, which would ideally be required for the aforementioned cases if several partial areas and/or objects are to be coated in one coating booth, is usually not economical. In certain cases, different vehicle models with different motor vehicle body geometries are also coated in one coating booth. It is possible that the areas to be coated on the different vehicle models are inclined differently.

An object of the disclosure is to provide an improved and/or alternative application method for coating different, preferably differently steep, partial areas of an object, preferably one or more motor vehicle body parts.

DETAILED DESCRIPTION

Figure 1:
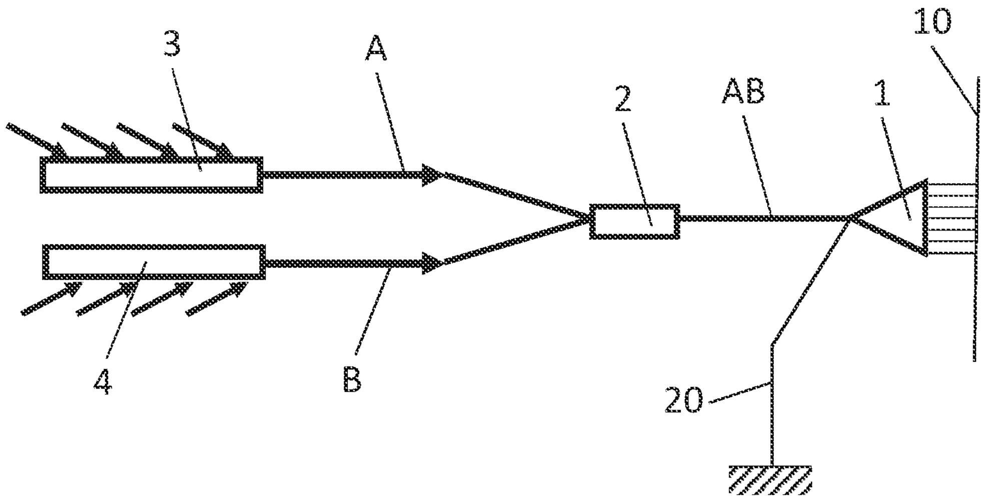
FIG. 1 illustrates an application method according to an embodiment of the disclosure.

The disclosure relates to an application method for (for example partially or completely) coating different, preferably differently steep, partial areas of an object, preferably one or more motor vehicle body parts (e.g. a motor vehicle body roof, a motor vehicle body hood (e.g. trunk and/or engine hood), a motor vehicle body side wall, a motor vehicle body fender, a motor vehicle body door, a motor vehicle body roof strut and/or a motor vehicle body pillar (e.g. A, B, C and/or D pillar)).

In the context of the application method, an applicator is provided which applies a mixture (e.g. mixed in a mixer) of a first application agent and a second application agent to the partial areas.

It is possible that a mixing ratio of the mixture is advantageously changed, e.g. depending on different slopes of the partial areas. Alternatively or additionally, it is possible, e.g., that a mixing ratio of the mixture can be advantageously changed during the coating process of the partial areas.

The first application agent and the second application agent preferably comprise different viscosities.

The first application agent can preferably be an application agent that has been optimized for application to a substantially horizontally oriented partial area.

The second application agent can preferably be an application agent that has been optimized for application to a substantially vertically oriented partial area.

In the context of the disclosure, it is possible that the mixing ratio is changed in particular depending on different slopes of the partial areas and/or during the coating process of the partial areas, preferably such that the mixing ratio can be adapted, in particular optimized, substantially to differently steep partial areas.

The mixing ratio can be changed, e.g., depending on different slopes of the partial areas, e.g. such that the mixing ratio comprises a lower viscosity in a partial area with a small slope than in a partial area with a large slope.

The partial areas can, e.g., comprise at least one substantially horizontal partial area and/or at least one substantially vertical partial area.

However, it is also possible that the partial areas comprise at least one inclined slanted (e.g. substantially flat) partial area and at least one (e.g. uniaxially or multiaxially) curved partial area with different slopes.

The partial areas can, e.g., also comprise differently inclined slanted (e.g. substantially flat) partial areas with different slopes and/or differently (e.g. uniaxially or multiaxially) curved partial areas with different slopes.

The partial areas can preferably comprise a first partial area, e.g. at least one substantially horizontal partial area, at least one slightly (expediently uniaxially or multiaxially) curved partial area and/or at least one slightly inclined slanted (e.g. substantially flat) partial area, etc.

The partial areas can preferably comprise at least one further partial area, e.g. at least one substantially vertical partial area, at least one strongly (expediently uniaxially or multiaxially) curved partial area and/or at least one strongly inclined slanted (e.g. substantially flat) partial area, etc.

The at least one further partial area comprises, e.g, a greater slope than the first partial area and is thus in particular steeper than the first partial area.

The first application agent preferably comprises a lower viscosity than the second application agent. In other words, the second application agent preferably comprises a higher viscosity than the first application agent.

It is possible that a mixture with a first mixing ratio and/or only the first application agent is applied to the first partial area. Alternatively or additionally, e.g., a mixture with a second mixing ratio and/or only the second application agent can be applied to the at least one further partial area.

In a preferred embodiment, the first mixing ratio and/or the first application agent comprises a lower viscosity than the second mixing ratio and/or the second application agent.

The partial areas and/or the first partial area and the at least one further partial area can e.g. be part of a motor vehicle body roof, part of a motor vehicle body hood (e.g. engine hood or trunk hood), part of a motor vehicle body side wall, part of a motor vehicle body roof strut, part of a motor vehicle body pillar, part of a motor vehicle body fender or part of a motor vehicle body door.

The first partial area and the at least one further partial area can thus, e.g., be part of one and the same motor vehicle body part, which may, however, comprise, e.g. different steep areas.

However, it is also possible, e.g., that the first partial area is, e.g., part of a motor vehicle body roof and/or part of a motor vehicle body hood (e.g. engine hood or trunk hood), which are usually (expediently at least partially) oriented substantially horizontally and/or comprise (expediently at least partially) a relatively small slope.

The at least one further partial area can, e.g., be part of a motor vehicle body door, part of a motor vehicle body side wall, part of a motor vehicle body fender, part of a motor vehicle body roof strut, part of a motor vehicle body pillar and/or part of a motor vehicle body door, which are usually (expediently at least partially) oriented substantially vertically and/or comprise (expediently at least partially) a relatively large slope.

The first partial area and the at least one further partial area can thus in particular be part of different motor vehicle body parts, which can in particular comprise differently steep areas.

The partial areas can, e.g., be coated partially with the mixture and partially only with the first application agent and/or partially only with the second application agent.

The mixing ratio can be changed, e.g., substantially abruptly (e.g. erratically or intermittently), continuously and/or steplessly.

A change of the mixture, in particular its mixing ratio, is possible e.g. once or several times per object, once or several times for the first partial area and/or once or several times for the at least one further partial area.

A mixer can be provided to mix the first application agent and the second application agent.

The first application agent and the second application agent can preferably be fed to the mixer via supply lines that are separate from one another, to be expediently mixable by means of the mixer.

The mixer can, e.g., be integrated in the applicator, wherein the applicator can in particular comprise two separate feeds for the first application agent and the second application agent, preferably a feed for the first application agent and a feed for the second application agent.

However, the mixer can also be arranged outside the applicator, e.g. on a manipulator for the applicator, in particular so that it moves together with the manipulator.

The first application agent covers a path distance, in particular from its feeding device (e.g. volume-regulated or pressure-regulated, in particular dosing pump or piston dosing device) via the mixer to the applicator. Alternatively or additionally, the second application agent covers a path distance, in particular from its feeding device (e.g. volume-regulated or pressure-regulated, in particular dosing pump or piston dosing device) via the mixer to the applicator.

It follows from this, e.g., that a change in the feeding of the first application agent and/or the second application agent is noticeable with a time offset on the object and thus in the coating result.

It is possible that the first application agent and/or the second application agent is fed with a time advance expediently by means of their feeding devices (e.g. dosing devices), so that, at one or more predefined target positions on the object, a change from the first application agent to the second application agent or vice versa takes place, and/or a change in the mixing ratio takes place.

The time advance can have been calculated or be calculated, e.g., depending on at least one of the following:

a path distance of the first application agent (e.g. from its feeding device via the mixer to the applicator and optionally to the object), and/or a path distance of the second application agent (e.g. from its feeding device via the mixer to the applicator and optionally to the object), and/or a flow speed and/or a volume flow of the first application agent and/or the second application agent, and/or a movement speed of the object, and/or a movement speed of the applicator.

The change of the mixing ratio can be carried out preferably as often as desired.

For example, a manipulator (e.g. a robot, in particular an articulated arm robot, or a linear movement machine (expediently an X-Y-Z linear unit or a travel rail)) can be provided for moving the object. Alternatively or additionally, a manipulator (e.g. a robot, in particular an articulated arm robot, or a linear movement machine (preferably an X-Y-Z linear unit)) can be provided for moving the applicator. Thus, e.g., embodiments are possible in which the object remains in a fixed position during coating or the applicator remains in a fixed position during coating, but also, e.g., embodiments in which the object and the applicator move relative to each other.

It is possible that a control device, in particular an electronic control device, is provided.

It is possible that the control device, e.g., calculates the time advance and/or the time advance is stored (e.g. saved) in a control device.

Alternatively or additionally, a coating program (e.g. painting program) can be saved in the control device, wherein, e.g., a suitable mixture, in particular a suitable mixing ratio, can be defined before the start or during the execution of the coating program. For this, one or more, expediently by the programmer, predefined commands or parameters can be used in the coating program.

It is possible that the first application agent is fed to the mixer via a first supply line and/or the second application agent is fed to the mixer via a second supply line. The first application agent and the second application agent can thus advantageously be fed to the mixer via separate feeding means.

The first application agent can be a mixed multi-component coating agent, the components of which are mixed in a premixer assigned to the first application agent, wherein alternatively or additionally the second application agent can be a mixed multi-component coating agent, the components of which are mixed in a premixer assigned to the second application agent.

It is possible that the premixer assigned to the first application agent is positioned expediently in the first supply line of the first application agent upstream before the mixer.

It is also possible that the premixer assigned to the second application agent is positioned expediently in the second supply line of the second application agent upstream before the mixer.

The first application agent can, e.g., be fed to the mixer via the first supply line, wherein the first supply line preferably comprises an application agent changer, by means of which the first application agent can be changed, so that it has, e.g., the same color, different viscosities and/or different material properties. Alternatively or additionally, the second application agent can be fed to the mixer via the second supply line, wherein the second supply line preferably comprises an application agent changer, by means of which the second application agent can be changed, so that it has, e.g., the same color, different viscosities and/or different material properties.

It is possible that the applicator is moved by means of a manipulator (e.g. robot, in particular articulated arm robot) and/or the object is moved by means of a manipulator (e.g. robot, in particular articulated arm robot).

The mixing ratio of the mixture can be changed, e.g., depending on commands from at least one manipulator path program (in particular for the manipulator for the applicator and/or for the manipulator for the object).

The mixer can preferably be positioned less than 50 cm, less than 20 cm or less than 10 cm downstream after the application agent changer of the first supply line. Alternatively or additionally, the mixer can preferably be positioned less than 50 cm, less than 20 cm or less than 10 cm downstream after the application agent changer of the second supply line.

The application agent changer can, e.g., be configured as a so-called color changer, wherein the application agent can be changed instead of colors, so that it comprises, e.g., the same color, but in particular different viscosities and/or different material properties.

It is possible that the first supply line comprises a feeding device for feeding the first application agent or comprises at least two feeding devices for feeding the components for the multi-component coating agent (e.g. respectively a feeding device for respectively an application agent), and/or the second supply line comprises a feeding device for feeding the second application agent or comprises at least two feeding devices for feeding the components for the multi-component coating agent (e.g. respectively a feeding device for respectively a component).

The feeding devices can in particular be dosing devices, expediently pressure-regulated or volume-regulated.

It is possible that the first application agent, the second application agent and the mixture are fed from the mixer to the applicator via a common supply conduit.

The first application agent and the second application agent can, e.g., be one or more of the following application agent variants:

the first application agent comprises a lower viscosity than the second application agent, and/or the first application agent and the second application agent are preferably paints of the same color, and/or the first application agent is glossy (e.g. high-glossy), in particular a gloss paint (e.g. high-gloss paint), and the second application agent is matt, e.g. a matt paint, or vice versa, and/or the first application agent is colorless, transparent and/or transparently colored and the second application agent is a non-transparent and/or opaque application agent, or vice versa, and/or the first application agent (A) is colorless and the second application agent (B) is a transparently colored application agent (B) or vice versa, and/or the first application agent and the second application agent comprise the same or different colors and are preferably opaquely pigmented, and/or the first application agent is a base coating agent (e.g. a base paint) and the second application agent is an application agent with a modified additive composition (e.g. thinner or thickener) or vice versa, which are preferably mixed to modify the properties of the base coating agent, and/or the first application agent and the second application agent react with each other and their reaction leads to different paint film properties (for example to a structure, gloss and/or color effect) depending on the mixing ratio of the mixture, and/or the first application agent and the second application agent react with each other and their reaction leads to differently pronounced coating surfaces (for example structure, gloss and/or color effect) as a result of incompatibility depending on the mixing ratio of the mixture.

The disclosure also comprises an application device, e.g. a paint booth, for coating different, preferably differently steep, partial areas of an object, preferably one or more motor vehicle body parts.

The application device is used in particular for execution and/or realizing the application method as disclosed herein.

The application device comprises an applicator which is configured to apply a mixture of a first application agent and a second application agent to the partial areas, and a (e.g. electronic) control device which comprises a control program, so that when the control program is executed, the application method as disclosed herein can be executed preferably in a program-controlled manner.

It is thus possible, in particular, that the mixing ratio of the mixture is advantageously changed by execution of the control program, e.g. depending on different slopes of the partial areas and/or during the coating process of the partial areas.

It is possible that the application device comprises a manipulator (e.g. robot, in particular articulated arm robot) for moving the applicator and/or a manipulator (e.g. robot, in particular articulated arm robot) for moving the object.

The control device can be configured to change the mixing ratio of the mixture depending on commands from at least one manipulator path program (in particular for the manipulator for the applicator and/or for the manipulator for the object).

The mixing ratio or ratios can thus preferably be defined by one or more commands in the path program of the manipulator for the applicator and/or in the path program of the manipulator for the object and, e.g., be read and executed (preferably program-controlled) by the control device.

The control device can, e.g., comprise at least one computing unit and/or at least one processor.

The control device can comprise, e.g., a memory unit in which a control software (e.g. the control program, the at least one manipulator path program, etc.) and/or control logic can be stored, according to which the application method can be executed.

In the context of the disclosure, it is possible, e.g., that the control device is distributed with its function to a central control unit or several different hardware components and/or control units.

The mixer can be, e.g., a static or dynamic mixer.

The premixers can also be, e.g., static or dynamic mixers.

The manipulator can be, e.g., a robot, in particular an articulated arm robot, wherein the mixer can be expediently installed, e.g., on an articulated arm (e.g. on "arm 1" or "arm 2" of the robot), on a robot base or on a translatory movement axis (e.g. "axis 7" of a robot), e.g. on a cabin wall.

The mixer is preferably positioned less than 50 cm, less than 20 cm or less than 10 cm, in particular upstream before the applicator.

The applicator can be, e.g., an atomizer (e.g. a rotary atomizer or air atomizer).

The applicator can be, e.g., a print head with a plurality of application agent openings (e.g. a piezo or inkjet print head), in particular for overspray-free and/or non-atomizing coating of the object.

The applicator can also be, e.g., an applicator (e.g. a print head with a plurality of application agent openings) that outputs a continuous application agent jet, which preferably breaks up into droplets between the applicator and the object or hits the object as a continuous application agent jet.

The applicator can also be, e.g., an applicator (e.g. a print head with a plurality of application agent openings) which outputs an application agent droplet jet, so that, e.g., application agent droplets impinge on the object.

In the context of the disclosure, it is particularly possible to coat differently oriented, in particular differently steep, partial areas with an expediently optimized application agent recipe (e.g. first application agent, second application agent and/or mixture of first application agent and second application agent).

For this, e.g., two application agents can be used, namely a first application agent that has been optimized for application to a predominantly horizontally oriented area and a second application agent that has been optimized for application to a predominantly vertically or very steeply oriented area.

The first application agent and the second application agent can be mixed together in predefined mixing ratios depending on the steepness and/or slope of the (e.g. flat, horizontal, vertical, inclined and/or curved) coating area to be advantageously ideally adapted to the coating area.

Advantages are in particular: Avoidance of a product change (time and material loss) during the coating process, loss-free and fully flexible adaptation of the coating material and/or reduction of material loss, time loss and/or rinsing agent requirement.

The mixing ratio of the mixture can preferably be changed during the coating process of the partial areas (e.g. abruptly, steplessly or continuously, and/or once or several times), e.g. during the application by means of the applicator or during an interruption of the application by means of the applicator (e.g. between the partial areas). In the latter case, e.g., application by means of the applicator can be interrupted (particularly briefly), the mixing ratio be changed during the interruption and thereupon the object, particularly the partial areas, be coated further.

It is thus possible, e.g., that the application by means of the applicator is expediently interrupted, then the mixture is changed and then is applied further.

It should be mentioned that the application method is an application method preferably for external coating of the object, preferably for external coating of one or more motor vehicle body parts.

The object and thus, e.g., the one or more motor vehicle body parts can preferably be configured from metal and/or plastic.

The object can be, e.g., a (e.g. substantially complete) motor vehicle body.

The one or the more motor vehicle body parts can also be or include, e.g., one or more motor vehicle body add-on parts.

It should also be mentioned that, in the context of the disclosure, the object, the partial areas, the first partial area and/or the at least one further partial area can expediently be coated completely or only partially.

It should further be mentioned that the mixture can comprise, e.g., more than two different application agents, e.g. the first application agent, the second application agent and at least one further application agent, which can preferably be fed to the mixer, e.g. via a further supply line or via at least one of the application agent changers.

The mixture, in particular its mixing ratio, is preferably freely selectable and can, e.g., be defined in a coating program (e.g. painting program) by one or more commands or parameters.

The application agent feeding of the first application agent and/or the second application agent can preferably be pressure-regulated or volume-regulated, e.g. by means of an assigned dosing pump (in particular volume-regulated) or an assigned piston dosing device.

The motor vehicle body pillar can, e.g., comprise an A-pillar, a B-pillar, a C-pillar and/or a roof arch (expediently connection between A-pillar and C-pillar).

The time advance can, e.g., be saved in the control device in a basic setting and can preferably be changed by means of correction factors, e.g. adapted to respective conditions. One of the correction factors can be calculated, e.g., by the control device depending on the volume flow of the first application agent and/or the second application agent. If, e.g. in the coating and/or control program (in particular manipulator path program), the volume flow is changed at a path point, the control device can take this into account in advance.

The preferred embodiments of the disclosure described with reference to the figures correspond in part, wherein similar or identical parts are provided with the same reference signs and to their explanation reference can also be made to the description of the other embodiments in order to avoid repetitions.

Figure 2:
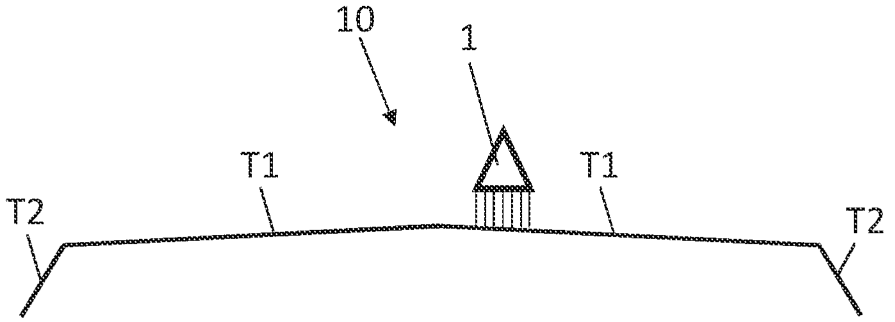
FIG. 2 shows a schematic view of an exemplary object which can be coated by means of an application method according to the disclosure.

FIG. 1 illustrates an application method according to an embodiment of the disclosure, in particular for e.g. partially or substantially complete coating of different, in particular differently steep, partial areas T1, T2 of an object 10, shown only schematically in FIGS. 1 and 2, preferably one or more motor vehicle body parts, e.g. a motor vehicle body roof, a motor vehicle body hood, a motor vehicle body roof strut, a motor vehicle body pillar, a motor vehicle body side wall, a motor vehicle body fender and/or a motor vehicle body door.

The coating is performed by means of an applicator 1, which applies a mixture AB of a first application agent A and a second application agent B to the, in particular differently steep, partial areas T1, T2. The first application agent A and the second application agent B can be fed to a mixer 2, preferably via supply lines which are separate from one another, to expediently be mixable by means of the mixer 2.

The first application agent A and the second application agent B are preferably paints, in particular paints of the same color, wherein the second application agent B comprises a higher viscosity than the first application agent A.

The applicator 1 is moved by a schematically shown manipulator 20, wherein the manipulator 20 can be, e.g., a robot, in particular an articulated arm robot. Alternatively or additionally, it is possible that also the object 10 can be moved by means of a manipulator such as a robot or a travel rail.

With reference to FIG. 2, the first partial area T1 is substantially horizontal or only very slightly inclined. The further partial area T2 is steeper than the first partial area T1 and thus comprises a larger slope than the first partial area T1. At least one of the exemplarily flatly shown partial areas T1, T2 can also be, e.g. curved uniaxially or multiaxially.

The first application agent A is expediently an application agent that has been optimized for the application to a substantially horizontally oriented area.

The second application agent B is expediently an application agent that has been optimized for the application to a substantially vertically or very steeply oriented area.

The first application agent A therefore preferably comprises a lower viscosity than the second application agent B. In other words, as previously mentioned, the second application agent B has a higher viscosity than the first application agent A.

In the context of the disclosure, it is possible that the mixing ratio of the mixture AB is changed depending on the different slopes, in particular depending on the differently steep, partial areas T1, T2, preferably such that the mixing ratio is substantially adapted, in particular optimized, to the differently steep partial areas T1, T2.

Alternatively or additionally, it is possible in the context of the disclosure that the mixing ratio of the mixture AB is changed during the coating process of the partial areas T1, T2, e.g. during the application by means of the applicator 1 or during an interruption of the application by means of the applicator 1.

The mixing ratio of the mixture AB can be changed, e.g., during the coating process of the partial areas T1, T2, and in particular during an interruption of the application. Thus, the application can be advantageously interrupted, the mixing ratio be changed during the interruption and thereupon the object 10 be further coated. This includes, e.g., embodiments in which the application by means of the applicator 1 is interrupted, then the mixture AB is changed and then the object 10 is further coated.

For example, a mixture AB with a first mixing ratio and/or only the first application agent A can be applied to the first partial area T1. A mixture AB with a second mixing ratio and/or only the second application agent B can be applied to the further partial area T2. Here, the first mixing ratio and/or the first application agent A can comprise a lower viscosity than the second mixing ratio AB and/or the second application agent B.

The mixture AB and thus its mixing ratio can be changed, e.g., during the application expediently abruptly, steplessly and/or continuously.

The object 10 and, in particular the partial areas T1, T2, can be coated expediently partially with an in particular slope-adapted mixture AB and optionally coated partially only with the first application agent A and/or optionally coated partially only with the second application agent B.

The first application agent A travels a certain path distance, in particular from its feeding device not shown in the figures (e.g. dosing device, expediently a dosing pump or piston dosing device, preferably pressure-regulated or volume-regulated) via the mixer 2 to the applicator 1. The second application agent B also travels a certain path distance, in particular from its feeding device not shown in the figures (e.g. dosing device, expediently a dosing pump or piston dosing device, preferably pressure-regulated or volume-regulated) via the mixer 2 to the applicator 1.

A change in the feeding of the first application agent A and the second application agent B is therefore disadvantageously only noticeable with a time offset on the object 10 and thus in the coating result.

Therefore, the first application agent A and the second application agent B can be fed by their associated feeding device e.g. with a time advance, so that, at one or more predefined target positions on the object 10, in particular the partial areas T1, T2, a change from the first application agent A to the second application agent B or vice versa takes place and alternatively or additionally a change in the mixing ratio takes place.

The time advance can, e.g., be calculated or have been calculated depending on one or more of the following parameters: a path distance of the first application agent A (e.g. from its feeding device via the mixer 2 to the applicator 1 and optionally to the object 10), a path distance of the second application agent B (e.g. from its feeding device via the mixer 2 to the applicator 1 and optionally to the object 10), a flow speed and/or a volume flow of the first application agent A and the second application agent B, a movement speed of the object 10 and/or a movement speed of the applicator 1.

For example, the time advance can be calculated in an electronic control device or can be stored in an electronic control device, so that the control device can control the feeding of the first application agent A and the second application agent B, in particular taking into account the time advance.

The time advance can in particular be saved in the control device in a basic setting and can preferably be changed by means of correction factors and in particular adapted to respective conditions. One of the correction factors can, for example, be calculated by the control device depending on the volume flow of the first application agent A and/or the second application agent B. If (e.g. in the coating program) the volume flow is changed at a path point, the control device can take this into account in advance.

FIG. 1 shows that the first application agent A and the second application agent B are fed to the mixer 2 via supply lines which are separate from one another, wherein the first application agent A, the second application agent B and the mixture AB are fed from the mixer 2 to the applicator 1 via a common supply conduit. In FIG. 1, the mixer 2 is positioned outside the applicator 1, although it is also possible to position the mixer 2 inside the applicator 1.

The first application agent A is fed to the mixer 2, e.g., via a first supply line, wherein the first supply line can optionally comprise an application agent changer 3, by means of which the first application agent A can be changed, which is shown schematically by the arrows leading into the application agent changer 3. Thereby, it is possible to feed different first application agents A, e.g. with the same color but preferably different viscosities and/or different material properties.

Alternatively or additionally, the second application agent B can be fed to the mixer 2 via a second supply line, wherein the second supply line can preferably comprise an application agent changer 4, by means of which the second application agent B can be changed, which is shown schematically by the arrows leading into the application agent changer 4. Thereby, it is possible to feed different second application agents B, e.g. with the same color but preferably different viscosities and/or different material properties.

It should be mentioned that the application agent changers 3 and 4 can be configured constructionally, e.g., like a so-called color changer, wherein the application agent can be changed instead of colors.

Figure 3:
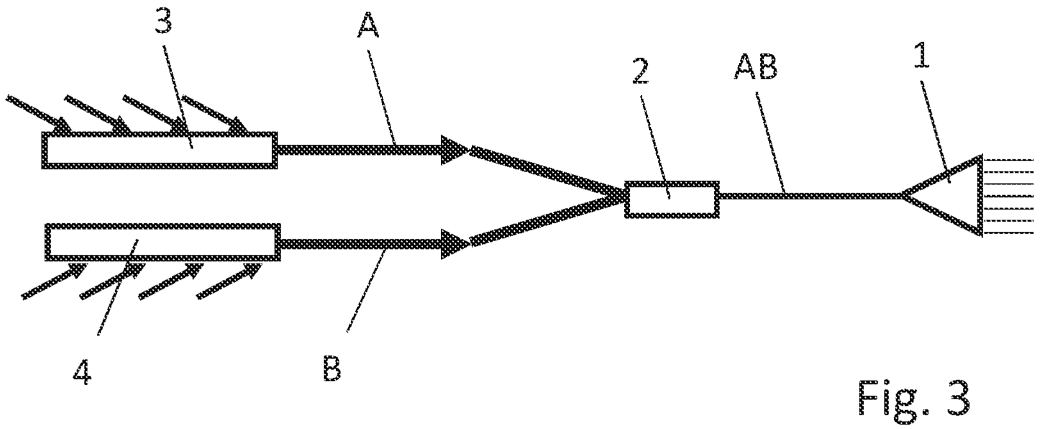
FIG. 3 illustrates an application method according to an embodiment of the disclosure, with a mixing ratio between the first application agent and the second application agent of, for example, 50% to 50%.

FIG. 3 illustrates an embodiment with a mixture AB with a mixing ratio of the first application agent A and the second application agent B of 50% to 50%.

Figure 4:
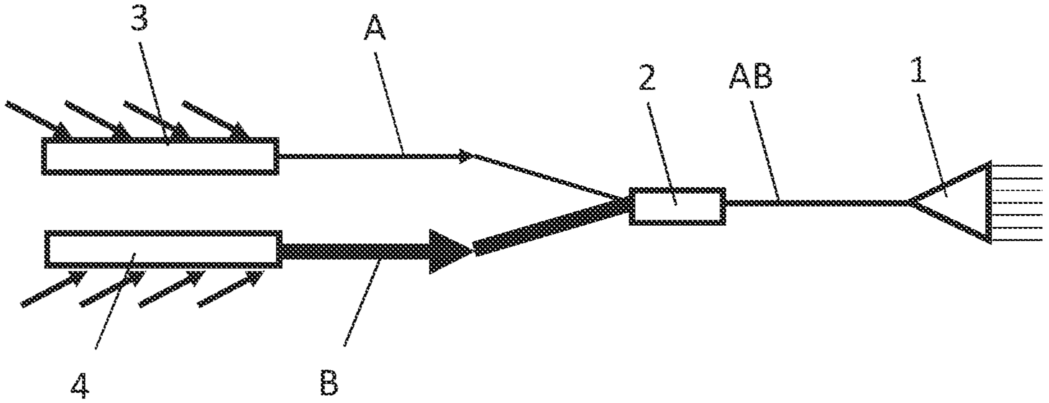
FIG. 4 illustrates an application method according to an embodiment of the disclosure, with a mixing ratio between the first application agent and the second application agent of, for example, 10% to 90%.

FIG. 4 illustrates an embodiment with a mixture AB with a mixing ratio of the first application agent A and the second application agent B of 10% to 90%.

Figure 5:
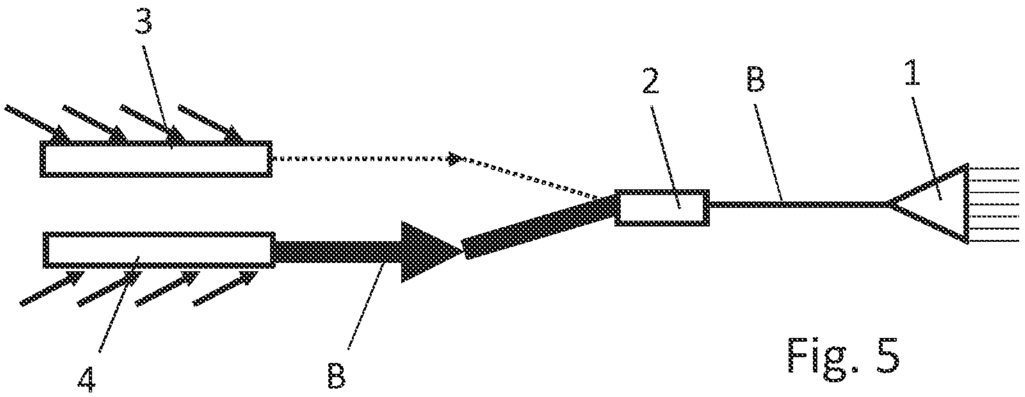
FIG. 5 illustrates an application method according to an embodiment of the disclosure, wherein only the second application agent is applied.

FIG. 5 illustrates an embodiment of the disclosure in which only the second application agent B is applied.

It is possible, e.g., that a motor vehicle body roof is coated only with the first application agent A. The first partial area T1 can thus include the motor vehicle body roof.

It is possible, e.g., that a motor vehicle body roof strut and/or a motor vehicle body A-pillar is coated with a mixture AB, e.g. with a mixing ratio of 50% application agent A and 50% application agent B. The further partial area T2 can thus include the motor vehicle body roof strut and/or the motor vehicle body A-pillar.

It is possible, e.g., that a motor vehicle body door is coated only with the second application agent B. The further partial area T2 can thus include the motor vehicle body door.

However, the partial areas T1 and T2 can also be part of one and the same motor vehicle body part, in particular if the motor vehicle body part comprises differently steep areas to be coated.

Figure 6:
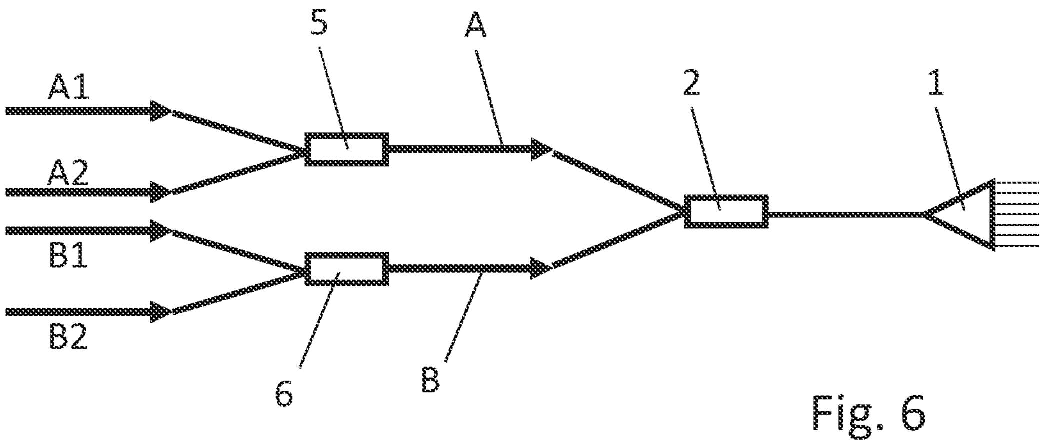
FIG. 6 illustrates an application method according to an embodiment of the disclosure, wherein a first application agent is a multi-component coating agent and a second application agent is a multi-component coating agent.

FIG. 6 illustrates an embodiment of the disclosure, wherein a first application agent A is a mixed multi-component coating agent, the components A1, A2 of which are mixed in a premixer 5 assigned to the first application agent A, and a second application agent B is a mixed multi-component coating agent, the components B1, B2 of which are mixed in a premixer 6 assigned to the second application agent B.

The premixer 5 is integrated in the supply line of the first application agent A, wherein the premixer 6 is integrated in the supply line of the second application agent B.

Figure 7:
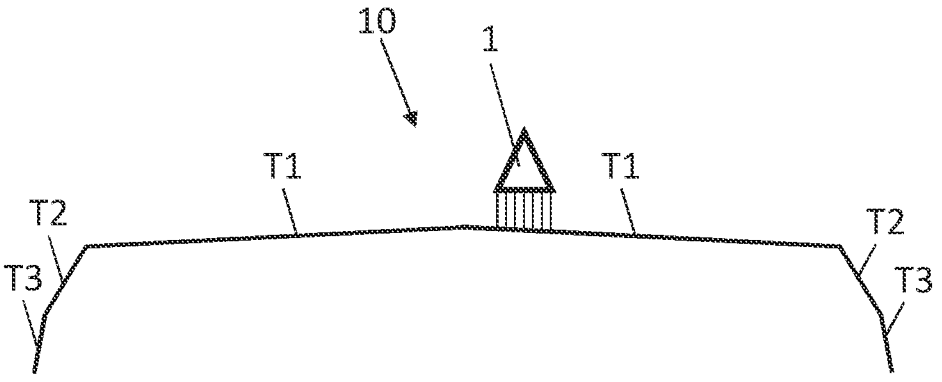
FIG. 7 shows a schematic view of an exemplary object which can be coated by means of an application method according to the disclosure.

FIG. 7 shows a schematic view of an exemplary object 10 that can be coated by means of an application method according to the disclosure. In contrast to the embodiment of FIG. 2, the object 10 of FIG. 7 has, in addition to the first partial area T1, several further partial areas T2 and T3, wherein the partial areas T1, T2, T3 are formed differently steep and thus comprise different slopes.

A change of the mixture AB, in particular its mixing ratio, is possible once or several times per object 10 and/or once or several times per partial area T1, T2 and/or T3.

Figure 8:
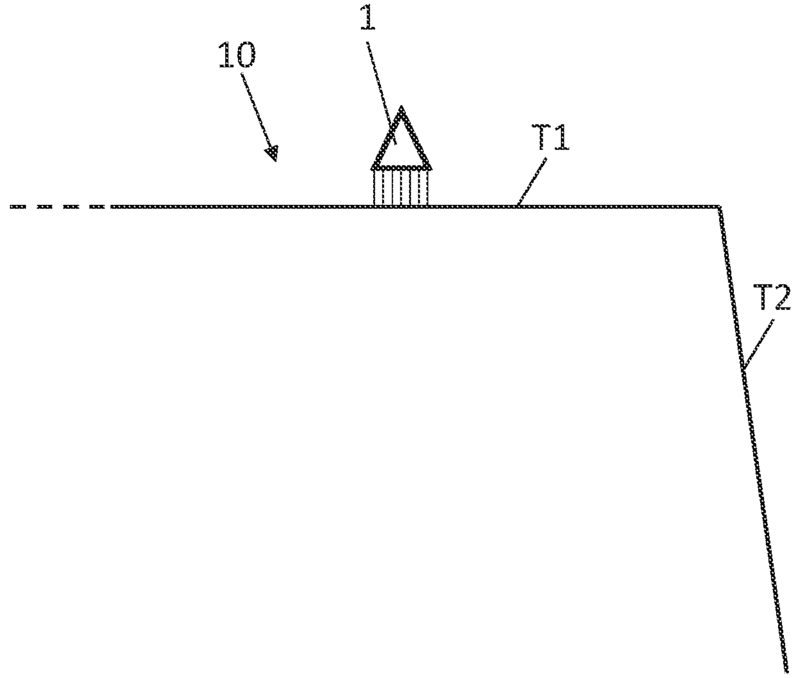
FIG. 8 shows a schematic view of another exemplary object which can be coated by means of an application method according to the disclosure.

FIG. 8 shows a schematic view of an exemplary object 10 that can be coated by means of an application method according to the disclosure. Here, the first partial area T1 can, e.g., be part of a motor vehicle body roof and the further partial area T2 can, e.g., be part of a motor vehicle body door and/or a motor vehicle body side wall.

The partial areas T1, T2 and T3, shown schematically in FIGS. 2, 7 and 8, may be, but do not have to be solely substantially flat areas. One, several or all of the partial areas T1, T2 and/or T3 can, e.g., be substantially flat and/or can, e.g., be curved uniaxially or multiaxially, as usual in motor vehicle body parts, for example.

The object 10 and/or the partial areas T1, T2, T3 can, e.g., be coated completely or only partially.

Figure 9:
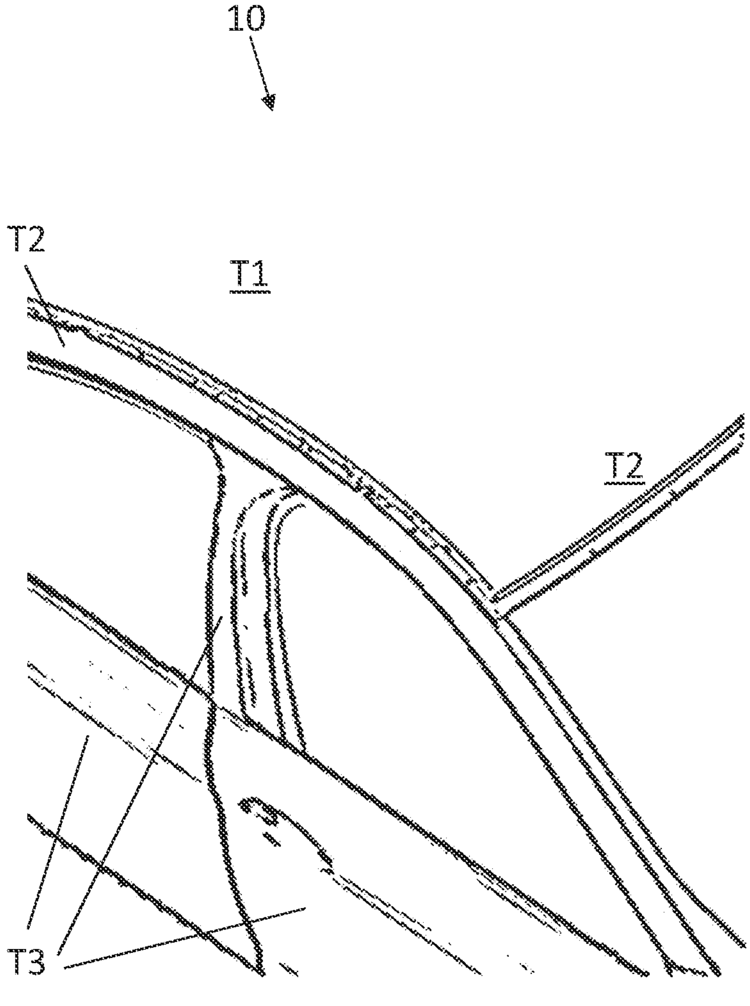
FIG. 9 shows a perspective view of another exemplary object which can be coated by means of an application method according to the disclosure.

FIG. 9 shows a view of another exemplary object 10 that can be coated by means of an application method according to the disclosure. FIG. 9 shows in particular a part of a motor vehicle body, with a motor vehicle body roof, a motor vehicle body door, a motor vehicle body roof strut and motor vehicle body pillars.

The motor vehicle body roof comprises differently steep partial areas, e.g. a partial area T1 with a relatively small slope and a partial area T2 with a relatively large slope.

The motor vehicle body door, the motor vehicle body roof strut and the motor vehicle body pillars comprise partial areas T2, T3 with also a relatively large slope.

The partial area T1 can be coated, e.g., with a mixing ratio with a relatively low viscosity and/or only with the first application agent A.

The further partial areas T2 and T3 can be coated, e.g., with a mixing ratio with a relatively high viscosity and/or only with the second application agent B.

The (expediently differently oriented, preferably differently steep) partial areas T1, T2, T3 can comprise, e.g., at least one substantially horizontal partial area, at least one substantially vertical partial area, at least one strongly curved partial area, at least one weakly curved partial area, at least one strongly inclined slanted (e.g. substantially flat) partial area and/or at least one weakly inclined slanted (e.g. substantially flat) partial area, etc.

The first application agent A and the second application agent B can be mixed together expediently in predefined mixing ratios depending on the slope (e.g. steepness) of the (e.g. planar, horizontal, vertical, inclined and/or curved) coating area, in particular the partial areas T1, T2, T3, so that their mixing ratio can advantageously be ideally adapted to the coating area.

The disclosure is not limited to the preferred embodiments described above. Rather, a plurality of variants and modifications are possible which also make use of the concept of the disclosure and therefore fall within the scope of protection. In addition, the disclosure also claims protection for the subject matter and the features of the sub-claims independently of the features and claims referred to.

The invention claimed is:

1. An application method for coating differently steep, partial areas of an object, with an applicator comprising:
- applying a mixture of a first application agent and a second application agent to the partial areas,
- wherein a mixing ratio of the mixture is changed during the coating process of the partial areas and/or depending on different slopes of the partial areas, and
- wherein at least one of the first and second application agents is a mixed multi-component coating agent, the components of which are mixed in a premixer.

2. The application method according to claim 1, wherein the mixing ratio is changed depending on different slopes of the partial areas, so that the mixing ratio comprises a lower viscosity in a partial area with a small slope than in a partial area with a large slope.

3. The application method according to claim 2, wherein the partial areas comprise at least one substantially horizontal partial area and/or at least one substantially vertical partial area.

4. The application method according to claim 2, wherein the partial areas comprise at least one inclined slanted partial area and at least one curved partial area with different slopes.

5. The application method according to claim 2, wherein the partial areas
- comprise differently inclined slanted partial areas with different slopes, and/or
- comprise differently curved partial areas with different slopes.

6. The application method according to claim 2, wherein the partial areas comprise a first partial area and at least one further partial area, wherein the at least one further partial area comprises a larger slope than the first partial area.

7. The application method according to claim 6, wherein
- a mixture with a first mixing ratio and/or only the first application agent is applied to the first partial area, wherein
- a mixture with a second mixing ratio and/or only the second application agent is applied to the at least one further partial area, and wherein
- the first mixing ratio and/or the first application agent comprises a lower viscosity than the second mixing ratio and/or the second application agent.

8. The application method according to claim 6, wherein
- the first partial area is part of a motor vehicle body roof and/or part of a motor vehicle body hood, and
- the at least one further partial area is part of a motor vehicle body roof strut, part of a motor vehicle body pillar, part of a motor vehicle body side wall, part of a motor vehicle body fender and/or part of a motor vehicle body door.

9. The application method according to claim 6, wherein the first application agent and/or the second application agent are fed with a time advance, so that, at one or more predefined target positions on the object,
- a change from the first application agent to the second application agent or vice versa takes place, and/or
- a change in the mixing ratio takes place.

10. The application method according to claim 9, wherein the time advance has been calculated or is calculated depending on at least one of the following:
- a path distance of the first application agent and/or the second application agent, and/or
- a flow speed or a volume flow of the first application agent and/or the second application agent, and/or
- a movement speed of the object, and/or
- a movement speed of the applicator.

11. The application method according to claim 9, wherein a control device calculates the time advance or the time advance is stored in a control device and the control device controls the feeding of the first application agent and/or the second application agent.

12. The application method according to claim 11, wherein a mixer is integrated in the applicator or arranged outside the applicator.

13. The application method according to claim 11, wherein
- the first application agent is a mixed multi-component coating agent, the components of which are mixed in a premixer assigned to the first application agent, and
- the second application agent is a mixed multi-component coating agent, the components of which are mixed in a premixer assigned to the second application agent.

14. The application method according to claim 13, wherein the premixer assigned to the first application agent and/or the premixer assigned to the second application agent is positioned upstream before the mixer.

15. The application method according to claim 11, wherein
- the first application agent is fed to the mixer via a first supply line, and
- the second application agent is fed to the mixer via a second supply line.

16. The application method according to claim 15, wherein
- the first supply line comprises a first application agent changer, and
- the second supply line comprises a second application agent changer.

17. The application method according to claim 15, wherein
- the first supply line comprises a feeding device for feeding the first application agent or comprises at least two feeding devices for feeding the components for the multi-component coating agent, and
- the second supply line comprises a feeding device for feeding the second application agent or comprises at least two feeding devices for feeding the components for the multi-component coating agent.

18. The application method according to claim 12, wherein the first application agent, the second application agent, and the mixture are fed from the mixer to the applicator via a common supply conduit.

19. The application method according to claim 6 the first application agent and the second application agent comprise different viscosities, and/or the first application agent and the second application agent are paints, and/or the first application agent is a gloss paint and the second application agent is a matt paint or vice versa, and/or the first application agent is colorless, transparent or transparently colored and the second application agent is a non-transparent or opaque application agent or vice versa, and/or the first application agent is colorless and the second application agent is a transparently colored application agent or vice versa, and/or the first application agent is a base coating agent and the second application agent is an application agent with a modified additive composition or vice versa, which are preferably mixed to change the properties of the base coating agent, and/or the first application agent and the second application agent comprise the same or different colors and are preferably opaquely pigmented, and/or the first application agent and the second application agent react with each other and their reaction leads to different paint film properties depending on the mixing ratio of the mixture, and/or the first application agent and the second application agent react with each other and their reaction leads to differently pronounced coating surfaces as a result of an incompatibility depending on the mixing ratio of the mixture.

20. The application method according to claim 2, wherein the partial areas and/or the first partial area and the at least one further partial area are part of a motor vehicle body roof, part of a motor vehicle body hood, part of a motor vehicle body side wall, part of a motor vehicle body roof strut, part of a motor vehicle body pillar, part of a motor vehicle body fender or part of a motor vehicle body door.

21. The application method according to claim 2, wherein the partial areas are coated partially with the mixture and are coated partially only with the first application agent and/or are coated partially only with the second application agent.

22. The application method according to claim 2, wherein the mixing ratio is changed abruptly, and/or is changed steplessly or continuously, and/or is changed once or several times.

23. The application method according to claim 2, wherein the applicator or the object is moved by means of a manipulator and the mixing ratio is changed depending on commands from at least one manipulator path program.

24. The application method according to claim 2, wherein the applicator is an atomizer, or is a print head with a plurality of application agent openings for overspray-free or atomization-free coating of the object, or is an applicator which outputs a continuous application agent jet which breaks up into droplets between the applicator and the object or hits the object as a continuous application agent jet, or is an applicator which outputs an application agent droplet jet.

25. The application method according to claim 1, wherein the first application agent comprises a lower viscosity than the second application agent.

* * * * *